(12) United States Patent
Chen et al.

(10) Patent No.: US 10,757,190 B2
(45) Date of Patent: Aug. 25, 2020

(54) METHOD, DEVICE AND COMPUTER PROGRAM PRODUCT FOR SCHEDULING MULTI-CLOUD SYSTEM

(71) Applicant: EMC IP Holding Company LLC, Hopkinton, MA (US)

(72) Inventors: Fei Chen, Beijing (CN); Fucai Liu, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/294,512

(22) Filed: Mar. 6, 2019

(65) Prior Publication Data

US 2019/0327303 A1 Oct. 24, 2019

(30) Foreign Application Priority Data

Apr. 20, 2018 (CN) .......................... 2018 1 0362291

(51) Int. Cl.
*G06F 15/16* (2006.01)
*H04L 29/08* (2006.01)

(52) U.S. Cl.
CPC .......... *H04L 67/1097* (2013.01); *H04L 67/22* (2013.01); *H04L 67/325* (2013.01); *H04L 29/08072* (2013.01)

(58) Field of Classification Search
CPC ... H04L 67/1097; H04L 67/22; H04L 67/325; H04L 29/08072; H04L 29/06; H04L 29/0809
See application file for complete search history.

(56) References Cited

U.S. PATENT DOCUMENTS

| | | | |
|---|---|---|---|
| 2003/0105810 A1* | 6/2003 | McCrory | H04L 29/06 709/203 |
| 2004/0148611 A1* | 7/2004 | Manion | H04L 29/06 719/328 |
| 2010/0235355 A1* | 9/2010 | Carter et al. | |
| 2011/0179141 A1* | 7/2011 | Ravichandran | G06Q 10/06 709/218 |
| 2011/0179162 A1* | 7/2011 | Mayo et al. | |
| 2011/0276951 A1* | 11/2011 | Jain | G06F 11/3006 717/140 |
| 2011/0295986 A1* | 12/2011 | Ferris | G06F 9/5072 709/222 |

(Continued)

OTHER PUBLICATIONS

NPL Google Patent (Year: 2020).*
NPL IP.com (Year: 2020).*

*Primary Examiner* — Razu A Miah
(74) *Attorney, Agent, or Firm* — Ryan, Mason & Lewis, LLP (57) ABSTRACT

A computer-implemented method comprises obtaining information of an application to be run by one of a plurality of cloud systems, obtaining history information resulted from the plurality of cloud systems running the application, in response to presence of the history information resulted from each of the plurality of cloud systems, scheduling the application to a first cloud system whose history information is matched with the obtained information for running the application and in response to lack of the history information resulted from at least one of the plurality of cloud systems, scheduling the application to a second cloud system of the at least one cloud system.

17 Claims, 3 Drawing Sheets

(56) References Cited

U.S. PATENT DOCUMENTS

| | | | |
|---|---|---|---|
| 2011/0295999 A1* | 12/2011 | Ferris | G06F 9/5072 709/224 |
| 2012/0130873 A1* | 5/2012 | Morgan | |
| 2012/0150930 A1* | 6/2012 | Jin | G06F 3/0611 707/827 |
| 2012/0209909 A1* | 8/2012 | Huang | G06Q 30/02 709/204 |
| 2012/0239739 A1* | 9/2012 | Manglik | G06F 9/5077 709/203 |
| 2012/0303740 A1* | 11/2012 | Ferris | |
| 2012/0303776 A1* | 11/2012 | Ferris | |
| 2013/0019015 A1* | 1/2013 | Devarakonda | G06F 9/5072 709/226 |
| 2013/0080619 A1* | 3/2013 | Assuncao et al. | |
| 2013/0191528 A1* | 7/2013 | Heninger et al. | |
| 2013/0246560 A1* | 9/2013 | Feng | H04L 29/0809 709/217 |
| 2014/0089449 A1* | 3/2014 | Bhogal | G06F 16/122 709/213 |
| 2014/0148246 A1* | 5/2014 | Quan | H04L 67/1095 463/24 |
| 2014/0181296 A1* | 6/2014 | Lee et al. | |
| 2014/0279201 A1* | 9/2014 | Iyoob | G06Q 30/0631 705/26.7 |
| 2014/0289412 A1* | 9/2014 | Doddavula | H04L 41/5003 709/226 |
| 2014/0310426 A1* | 10/2014 | Damola | H04L 67/325 709/235 |
| 2014/0337532 A1* | 11/2014 | Arnette et al. | |
| 2015/0006711 A1* | 1/2015 | Schaad | H04L 67/1097 709/224 |
| 2015/0019737 A1* | 1/2015 | Kim | G06F 9/5061 709/226 |
| 2015/0341230 A1* | 11/2015 | Dave | H04L 41/5058 705/7.29 |
| 2016/0021186 A1* | 1/2016 | de Sene | G06F 16/1827 709/213 |
| 2017/0103327 A1* | 4/2017 | Penilla et al. | |
| 2018/0077014 A1* | 3/2018 | Mazhar | H04L 43/10 |

* cited by examiner

METHOD, DEVICE AND COMPUTER PROGRAM PRODUCT FOR SCHEDULING MULTI-CLOUD SYSTEM

RELATED APPLICATION(S)

The present application claims priority to Chinese Patent Application No. 201810362291.7, filed Apr. 20, 2018, and entitled "Method, Device and Computer Program Product for Scheduling Multi-Cloud System," which is incorporated by reference herein in its entirety.

FIELD

Embodiments of the present disclosure generally relate to a computer system, a storage system or a cloud system, and more specifically, to a computer-implemented method, an electronic device and a computer program product.

BACKGROUND

Public cloud systems have become a resilient online resource that allows users to deploy and run applications easily. Typically, different cloud systems provide such resources with different prices, performance, availability and the like. When the users deploy and run an application in a multi-cloud environment, a scheduler is generally used to schedule the application to a certain cloud system for running the application based on information related to the application and cloud system.

More generally, the scheduler may be used to select one or more targets among a plurality of potential candidates. In a multi-cloud system, the scheduler may select different target cloud systems with different kinds of policies which possibly involve performance, costs, reliability and so on. At present, the scheduler typically uses static information or currently obtained transient information to schedule applications based on fixed rules. However, this scheduling approach can hardly achieve good scheduling results in many cases and thus cannot meet the user's requirements.

SUMMARY

Embodiments of the present disclosure relate to a computer-implemented method, an electronic device and a computer program product.

In a first aspect of the present disclosure, there is provided a computer-implemented method. The method comprises: obtaining information of an application to be run by one of a plurality of cloud systems. The method further comprises: obtaining history information resulted from the plurality of cloud systems running the application. The method further comprises: in response to presence of the history information resulted from each of the plurality of cloud systems, scheduling the application to a first cloud system whose history information is matched with the obtained information for running the application. The method still further comprises: in response to lack of the history information resulted from at least one of the plurality of cloud systems, scheduling the application to a second cloud system of the at least one cloud system.

In some embodiments, the method further comprises: updating the history information based on running of the application on at least one of the plurality of cloud systems.

In some embodiments, the second cloud system is selected randomly from the at least one cloud system.

In some embodiments, scheduling the application to the first cloud system comprises: determining history information having a highest matching degree with the information; determining that the history information is resulted from the first cloud system running the application; and assigning the application to the first cloud system.

In some embodiments, the method further comprises: determining, from the history information, a history duration for running the application; and predicting, based on the history duration, a duration for the first cloud system to run the application.

In some embodiments, obtaining the information comprises: determining an identifier and a workload of the application.

In some embodiments, the history information comprises at least one of the following: an identifier of a run application, an identifier of a cloud system that ran an application, a workload of an application, a running duration of an application, and whether an application needs to keep running until terminated by a user.

In a second aspect of the present disclosure, there is provided an electronic device. The electronic device comprises at least one processor; and at least one memory including computer program instructions, the at least one memory and the computer program instructions being configured to, together with the at least one processor, cause the electronic device to obtain information of an application to be run by one of a plurality of cloud systems. The at least one memory and the computer program instructions are further configured to, together with the at least one processor, cause the electronic device to obtain history information resulted from the plurality of cloud systems running the application. The at least one memory and the computer program instructions are further configured to, together with the at least one processor, cause the electronic device to: in response to presence of the history information of resulted from each of the plurality of cloud systems, schedule the application to a first cloud system whose history information is matched with the obtained information for running the application. The at least one memory and the computer program instructions are further configured to, together with the at least one processor, cause the electronic device to: in response to lack of the history information resulted from at least one of the plurality of cloud systems, schedule the application to a second cloud system of the at least one cloud system.

In some embodiments, the at least one memory and the computer program instructions are further configured to, together with the at least one processor, cause the electronic device to update the history information based on running of the application on at least one of the plurality of cloud systems.

In some embodiments, the second cloud system is selected randomly from the at least one cloud system.

In some embodiments, the at least one memory and the computer program instructions are further configured to, together with the at least one processor, cause the electronic device to: determine history information having a highest matching degree with the information; determine that the history information is resulted from the first cloud system running the application; and assign the application to the first cloud system.

In some embodiments, the at least one memory and the computer program instructions are further configured to, together with the at least one processor, cause the electronic device to: determine, from the history information, a history duration for running the application; and predict, based on the history duration, a duration for the first cloud system running the application.

In some embodiments, the at least one memory and the computer program instructions are further configured to, together with the at least one processor, cause the electronic device to: determine an identifier and a workload of the application.

In some embodiments, the history information comprises at least one of the following: an identifier of a run application, an identifier of a cloud system that ran an application, a workload of an application, a running duration of an application, and whether an application needs to keep running until terminated by a user.

In a third aspect of the present disclosure, there is provided a computer program product tangibly stored on a non-transitory computer readable medium and comprising machine executable instructions which, when executed, cause a machine to perform steps of the method according to the first aspect.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or similar reference symbols refer to the same or similar components.

DETAILED DESCRIPTION

Principles of the present disclosure will now be described with reference to various example embodiments illustrated in the drawings. It is to be understood that description of those embodiments is merely to enable those skilled in the art to better understand and further implement the present disclosure and not intended for limiting the scope disclosed herein in any manner.

Figure 1:
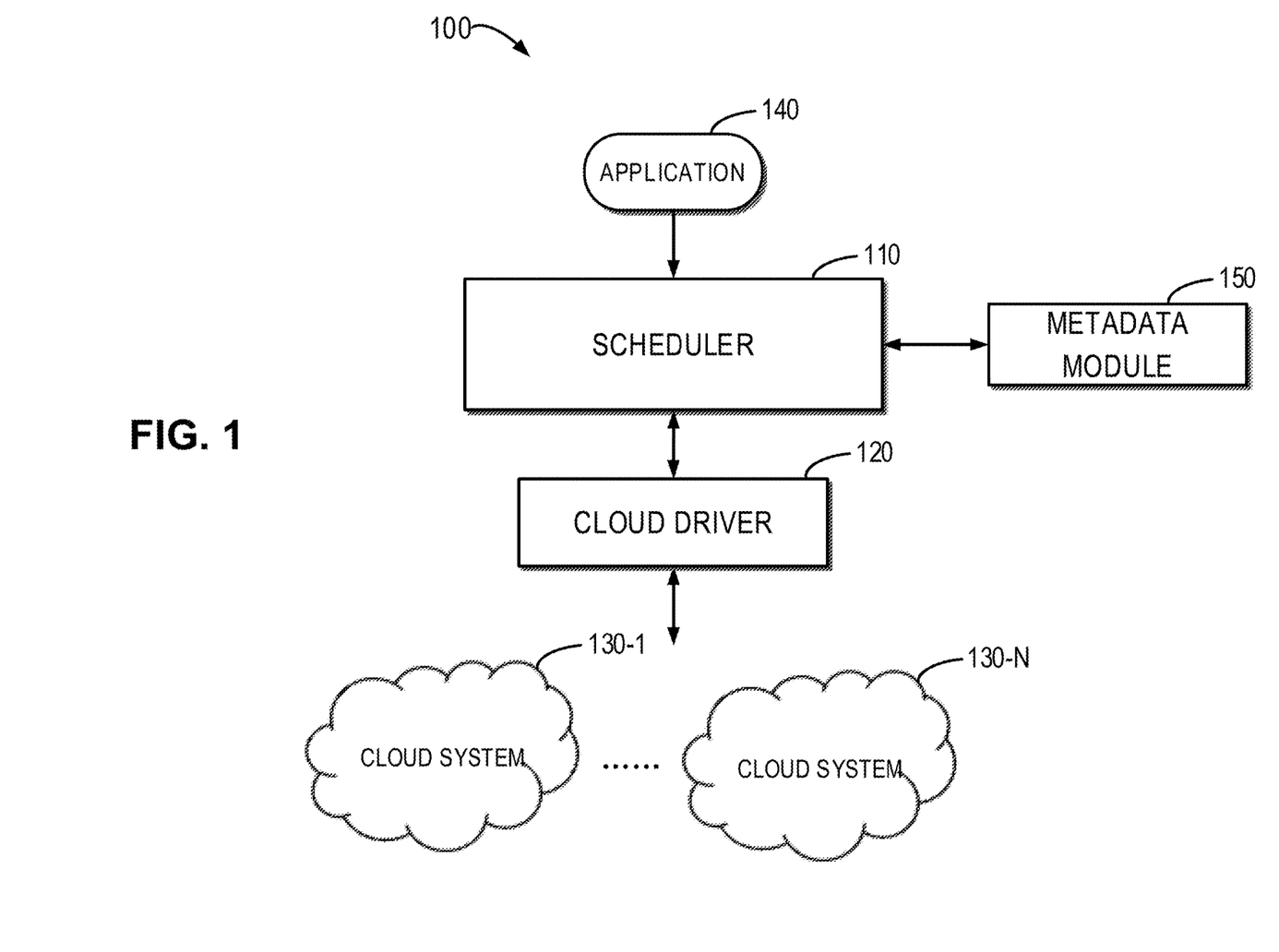
FIG. 1 is a schematic diagram illustrating application scheduling in a multi-cloud environment in which embodiments of the present disclosure may be implemented.

FIG. 1 is a schematic diagram illustrating application scheduling in a multi-cloud environment 100 in which embodiments of the present disclosure may be implemented. As shown in FIG. 1, the multi-cloud environment 100 includes a scheduler 110, a cloud driver 120 and a plurality of cloud systems 130-1 to 130-N (hereinafter collectively referred to as "cloud system 130"). In some embodiments, examples of the plurality of cloud systems 130-1 to 130-N may include various cloud systems provided by different entities (for example, companies). Generally, the scheduler 110 determines which of the plurality of cloud systems 130-1 to 130-N that the application 140 is scheduled to for deployment and operation.

To perform such scheduling, the scheduler 110 may obtain information associated with the cloud systems 130 from a metadata module 150, for instance, a price of a cloud resource provided by the cloud systems 130. Moreover, the scheduler 110 may further obtain some transient information from the cloud systems 130 through the cloud driver 120, such as how much of a resource of the cloud systems 130 is available presently. Based on this information, the scheduler 110 may determine which cloud system of the cloud systems 130 that the application 140 is scheduled to.

It is to be understood that FIG. 1 only schematically illustrates units, modules or components associated with embodiments of the present disclosure in the multi-cloud environment 100. In other embodiments, the multi-cloud environment 100 may further comprise additional units, modules or components for other functions, such as an execution module, an installation module, an authorization module and the like. Therefore, embodiments of the present disclosure are not limited to the specific units, modules or components depicted in FIG. 1.

As mentioned above, conventional schedulers typically utilize static information or currently obtained transient information to schedule applications based on fixed rules. However, this scheduling approach can hardly achieve good scheduling results in many cases and thus cannot meet user requirements. For example, one way of scheduling is to evaluate costs of running an application in different cloud systems. To this end, the metadata module may store, for instance, prices of cloud resources of different cloud systems as metadata, such as a price/hour per central processing unit (CPU) core, a price of dynamic random access memory (DRAM) storage resource per gigabyte (GB), a price of solid state drives (SSD) storage resource per GB and so on. Conventional schedulers employ this price information and price models to evaluate a total cost of completing the running of an application in each cloud system, and then select the cloud system with the lowest cost to run the application.

It has been realized by the inventors of the present disclosure that this scheduling approach may be problematic. For example, in some cases, even if a plurality of cloud systems claim to provide similar cloud resource configurations, performance of the same application operating in these cloud systems may be different, and the performance of the same application operating in the same cloud system may also be different and sometimes may vary significantly. The conventional scheduling approach cannot predict a time for completing the running of the application when the cloud system has different or varying performance.

Therefore, the conventional scheduling approach adopting a traditional price model can only determine the cost per unit time, but it is impossible to determine the cost for completing the running of the application. For applications that need to be run for a long time (such as background applications), the conventional scheduling approach may be appropriate. However, for some other applications, for instance, applications with a fixed size of workload, the conventional scheduling approach will give wrong scheduling output.

It has been further discovered by the inventors of the present disclosure that the above-mentioned problem with the conventional scheduler is mainly resulting from the use of static information or transient information to determine the cloud system to run the application. However, in some scenarios, information for scheduling possibly needs to be information over a period of time and should be updated dynamically. Only with such information, the optimal scheduling result may be achieved. Therefore, it shall be understood that the above-mentioned problem of the conventional scheduler does not only exist in the scheduling approach based on price model but also in other scheduling methods using static information or transient information.

In view of the above and other potential problems of the conventional scheduler, embodiments of the present disclosure provide a computer-implemented method, an electronic device and a computer program product. Embodiments of the present disclosure improve the scheduling approach of the conventional scheduler so that the scheduler determines the cloud system to run the application based on, in addition to static information or transient information, dynamic information or information over a period of time. Embodiments of the present disclosure collect and reuse runtime information associated with the application so as to optimize the scheduling result of the scheduler and enhance user experience. Reference will be made to the drawings below to depict embodiments of the present disclosure in detail.

Figure 2:
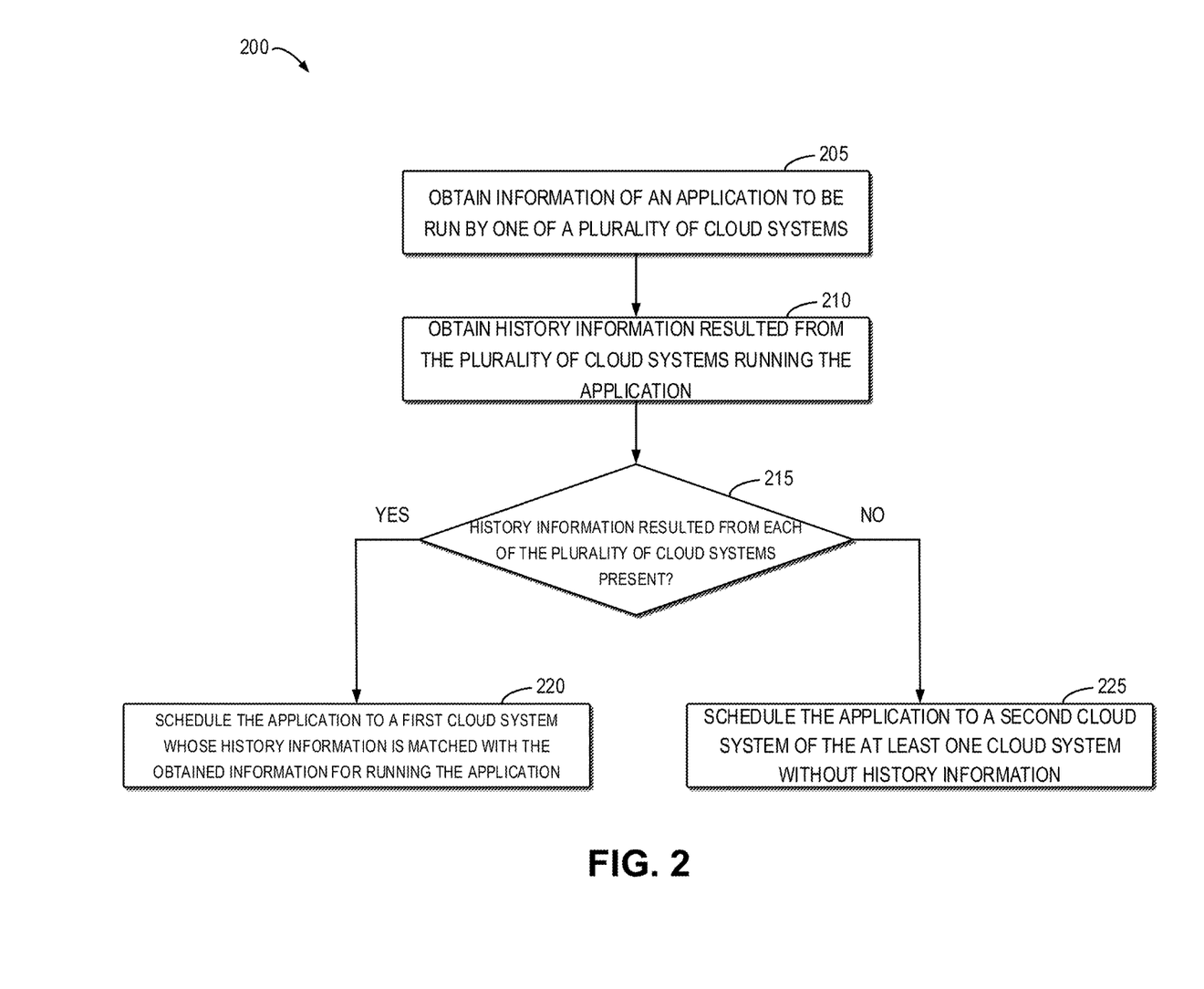
FIG. 2 is a flowchart illustrating a computer-implemented method in accordance with embodiments of the present disclosure.

FIG. 2 is a flowchart illustrating a computer-implemented method 200 in accordance with embodiments of the present disclosure. In some embodiments, method 200 may be implemented by the scheduler 110 in the multi-cloud environment 100, for instance, or may be implemented by a controller or controlling module in the scheduler 110 or various modules of the scheduler 110. In other embodiments, the method 200 may also be implemented by a computing device independent of the multi-cloud environment 100, or other units in the multi-cloud environment 100. For ease of discussion, the method 200 will be discussed in combination with FIG. 1.

At 205, the scheduler 110 obtains information of the application 140 to be run by one of the plurality of cloud systems 130. For example, the scheduler 110 may determine an identifier (such as an application name) and a workload (that is, the required amount of work) of the application 140. It shall be understood that in the multi-cloud environment 100, it is common for the same application 140 to be run multiple times while the workload for running the application 140 each time might be different. Therefore, obtaining the workload of the application 140 by the scheduler 110 facilitates scheduling the application 140 to be run by a more suitable cloud system 130.

Additionally, the workload of some applications (such as a background application, daemon) cannot be determined beforehand. Instead, these applications need to keep running until terminated by the user, so the workload of these types of applications may have special tags. In some other embodiments, in addition to the identifier and the workload of the application 140, the scheduler 110 may also obtain other information of the application 140 so as to schedule the application 140, such as the highest price acceptable to the user, the lowest performance acceptable to the user, the longest running time acceptable to the user and so on.

In some embodiments, obtaining the information of application 140 may be implemented by arranging an application matching module (not shown) in the scheduler 110. For example, the application matching module can identify different applications and respective workloads. As will be discussed below in detail, the output of the application matching module, namely, the information of application 140 obtained by the scheduler 110, may be used as an index in the history information for running applications in the cloud systems 130 and searching for the history information associated with the application 140.

At 210, the scheduler 110 obtains history information for running application 140 by the cloud systems 130-1 to 130-N in the plurality of cloud systems 130. Referring to FIG. 1, the scheduler 110 may (for example, through the application matching module, not shown) obtain the history information from the metadata module 150. Correspondingly, each time after scheduling the application to one of the cloud systems 130 (such as the cloud system 130-1) for running the application, the scheduler 110 may store history information associated with running the application by the cloud system 130-1 into the metadata module 150 for reference in the subsequent application scheduling. In some other embodiments, the scheduler 110 may also obtain history information from other units or modules.

In some embodiments, the history information may include an identifier of a run application, an identifier of a cloud system that ran an application, a workload of an application, and/or a running duration of an application, and so on. Therefore, the scheduler 110 may use the information of the application 140 as an index and search for the history information associated with the application 140 from all history information of all the cloud systems 130-1 to 130-N running all applications.

For example, the history information may be organized in a form of a data structure {an application identifier, a cloud system identifier, a workload, a running duration}. Taking the case that the cloud system 130-1 ran the application 140 as an example, the generated history information may be recorded as {the identifier of the application 140, the identifier of the cloud system 130-1, the workload for this running by the application 140, the running duration of this running by the application 140}.

It shall be understood that similar history information can be generated by each of the cloud systems 130-1 to 130-N running every application. It can be identified, with the identifier of the application and the identifier of the cloud system, which application and which cloud system that such history information corresponds to. Moreover, in order to distinguish an application that needs to be run for a long term and an application having a fixed workload in history information and to schedule these two kinds of applications reasonably on this basis, the history information may further include an information item about whether the application needs to keep running until terminated by the user.

Referring back to FIG. 2, at 215, the scheduler 110 determines if history information resulted from each of cloud systems 130-1 to 130-N for application 140 exists. That is, the scheduler 110 determines if each of the cloud systems 130-1 to 130-N once ran the application 140. For example, the scheduler 110 may search, based on an identifier of the application 140, for history information about the application 140 from the history information resulted from each of the cloud systems 130-1 to 130-N for all the applications to perform the above determination. In some embodiments, if each of the cloud systems 130-1 to 130-N once ran the application 140, the scheduler 110 may consider that there is sufficient information to schedule the application 140. Otherwise, the scheduler 110 may consider lack of sufficient information for performing this scheduling of the application 140.

At 220, in response to presence of the history information resulted from each cloud system 130-1 to 130-N for the application 140, the scheduler 110 schedules the application 140 to a first cloud system (such as the cloud system 130-1) whose history information is matched with the obtained information for running the application. As indicated above, each cloud system 130-1 to 130-N possibly once ran the application 140, and possibly ran the application 140 multiple times. However, the running of the application 140 by each cloud system 130-1 to 130-N might be different and the multiple times of running of the application 140 by the same cloud system might also be different. The running information reflecting these past runnings of the application 140 is all included in the history information obtained by the scheduler 110. Therefore, the scheduler 110 will determine history information matched with the information of the application 140 in the obtained history information and determine the cloud system to run the application 140 this time based on the history information.

During the process of scheduling the application 140 to the first cloud system (such as the cloud system 130-1), the scheduler 110 may determine the history information having the highest matching degree with the information of the application 140, then determine that the history information is resulted from the cloud system 130-1 running the application 140 and assign the application 140 to the cloud system 130-1. In this way, in the absence of history information completely matching the information of the application 140, the scheduler 110 may also implement this scheduling of the application 140 optimally.

By way of a specific example, the information of the application 140 that the scheduler 110 may obtain is {application 140, workload 90} while the obtained history information includes A: {application 140, cloud system 130-1, workload 10, running duration 10 hours}, B: {application 140, cloud system 130-1, workload 100, running duration 100 hours}, and C: {application 140, cloud system 130-2, workload 50, running duration 10 hours}. In this case, the scheduler 110 may determine the history information having the highest matching degree with the information of the application 140, namely, history information B. Then, the scheduler 110 may determine that the history information B is resulted from the cloud system 130-1 running the application 140. On this basis, the scheduler 110 may assign the application 140 to the cloud system 130-1 for running the application this time.

Continuing discussion with this example, the scheduler 110 may further determine from the history information B a history duration for running the application 140, such as 100 hours. As such, the scheduler 110 may predict based on the history duration the hours for the cloud system 130-1 running the application 140 this time, for example, approximately 90 hours. In addition, based on a price model in use, the scheduler 110 may further use the history duration to obtain an accurate cost prediction of running the application 140 with the cloud system 130-1 this time.

At 225, in response to lack of history information resulted from at least one (such as cloud system 130-N or the like) of a plurality of cloud systems 130-1 to 130-N, the scheduler 110 may schedule the application 140 to a second cloud system (such as the cloud system 130-N) of at least one cloud system for running the application. As mentioned above, if history information for running the application 140 by some cloud systems in the plurality of cloud systems 130 is absent, it may mean that the scheduler 110 does not have sufficient information to schedule the application 140. For example, the scheduler 110 might be unable to predict the cost of the application 140 run in a certain cloud system this time.

For example, this case may occur when the multi-cloud environment 110 is initialized and the scheduler 110 does not have any history information of any application running in any cloud system. Therefore, scheduling the application 140 to a cloud system that has never run the application 140 may enable the scheduler 110 to finally have sufficient information to make a correct scheduling decision for future scheduling of the application 140.

In a scenario in which more than one cloud system has never run the application 140, the second cloud system (such as the cloud system 130-N) may be selected randomly from the at least one cloud system. It should be understood that since none of the at least one cloud system has run the application 140, there is no history information for reference to schedule the application 140 to one of the at least one cloud system. In this case, the scheduler 110 may perform this scheduling randomly. The advantage of random scheduling is that no information is needed to complete the scheduling.

In some embodiments, this random scheduling may be performed by configuring a randomizer module (not shown) in the scheduler 110. Certainly, in other embodiments, the scheduler 110 may also select the second cloud system in any other manner that does not need history information, for instance, based on static information of a cloud system, according to an order in the alphabet of the first letters of names of cloud systems, and so on.

In some embodiments, the scheduler 110 may update the history information based on running of the application 140 on at least one (such as the cloud system 130-1 or cloud system 130-N) of the cloud systems 130 so as to enrich and extend the history information, thereby improving correctness of subsequent scheduling. For this purpose, after it is determined to schedule the application 140 to the cloud system 130-1 or the cloud system 130-N, the scheduler 110 may monitor various running information of the application 140 running on the cloud system 130-1 or cloud system 130-N, such as a running duration. Particularly, the scheduler 110 may further determine whether the application 140 stops running by itself or its running is terminated by a user. If the application 140 stops running by itself, then it might have a fixed workload. If the operation of application 140 is terminated by a user, then it may be an application that needs long-term running, such as a background application.

In some embodiments, a collection of running information may be performed by arranging a collection module (not shown) in the scheduler 110. In other embodiments, information related to running application 140 by the cloud system 130-1 or cloud system 130-N may also be collected by other storage units or modules, such as the cloud system 130-1 or cloud system 130-N. In this case, the scheduler 110 may obtain the running information from this storage unit or module.

After the running information is collected or obtained, the scheduler 110 may store the running information along with the identifier of the application 140 and the identifier of the cloud system 130-1 (or the cloud system 130-N) into the metadata module 150 or other storage modules so as to update the history information for reference in the subsequent scheduling of the application 140.

Figure 3:
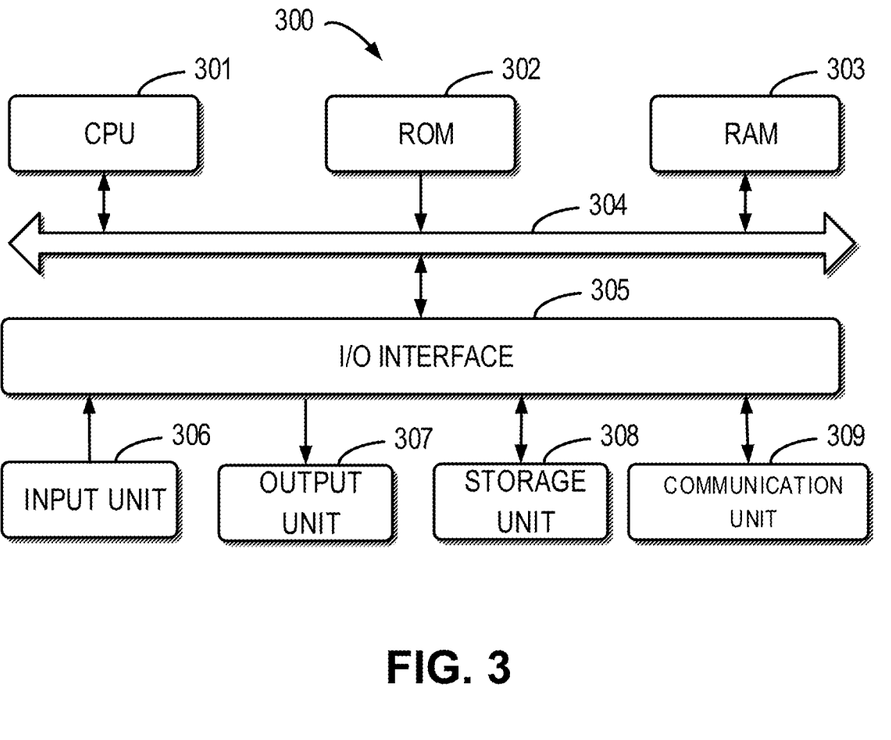
FIG. 3 is a schematic block diagram illustrating a device that may be used to implement embodiments of the present disclosure.

FIG. 3 is a block diagram illustrating a device 300 that may be used to implement embodiments of the present disclosure. As illustrated in the FIG. 3, the device 300 comprises a central processing unit (CPU) 301 which can execute various appropriate actions and processing based on computer program instructions stored in a read-only memory (ROM) 302 or computer program instructions loaded into a random access memory (RAM) 303 from a storage unit 308. The RAM 303 also stores all kinds of programs and data required by operating the storage device 300. The CPU 301, ROM 302 and RAM 303 are connected to each other via a bus 304 to which an input/output (I/O) interface 305 is also connected.

A plurality of components in the device 300 are connected to the I/O interface 305, which comprises an input unit 306, such as a keyboard, a mouse and the like; an output unit 307, such as various types of displays, loudspeakers and the like;

a storage unit 308, such as a magnetic disk, an optical disk and the like; and a communication unit 309, such as a network card, a modem, a wireless communication transceiver and the like. The communication unit 309 allows the device 300 to exchange information/data with other devices through computer networks such as Internet and/or various telecommunication networks.

Each procedure and process as described above, such as the method 200, can be executed by the processing unit 301. For example, in some embodiments, the method 200 can be implemented as computer software programs, which are tangibly included in a machine-readable medium, such as the storage unit 308. In some embodiments, the computer program can be partially or completely loaded and/or installed to the device 300 via the ROM 302 and/or the communication unit 309. When the computer program is loaded to the RAM 303 and executed by the CPU 301, one or more steps of the above described method 200 are implemented.

As used herein, the term "comprises" and its variants are to be read as open-ended terms that mean "comprises, but is not limited to." The term "based on" is to be read as "based at least in part on." The term "one embodiment" or "the embodiment" is to be read as "at least one embodiment." The terms "a first", "a second" and others can denote different or identical objects. The following text may also contain other explicit or implicit definitions.

As used in the text, the term "determine" covers various actions. For example, "determine" may include operating, calculating, processing, deriving, examining, looking up (such as look up in a table, a database or another data structure), finding out and so on. Furthermore, "determine" may include receiving (such as receiving information), accessing (such as accessing data in the memory) and so on. Meanwhile, "determine" may include analyzing, choosing, selecting, establishing and the like.

It should be noted that the embodiments of the present disclosure can be realized by hardware, software or a combination of hardware and software, where the hardware part can be implemented by a special logic; the software part can be stored in a memory and executed by a suitable instruction execution system such as a microprocessor or a special-purpose hardware. One of ordinary skill in the art will appreciate that the above system and method may be implemented with computer executable instructions and/or in processor-controlled code which is provided on a carrier medium such as a programmable memory or a data bearer such as an optical or electronic signal bearer.

Furthermore, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, and/or a step may be divided into a plurality of steps for execution. It will be noted that features and functions of two or more units described above may be embodied in one unit. In turn, features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

What is claimed is:

1. A computer-implemented method, comprising:
obtaining application information of an application to be run by one of a plurality of cloud systems;
obtaining history information corresponding to the application from each of the plurality of cloud systems that has previously run the application;
based at least in part on a determination that the history information has been obtained from each cloud system of the plurality of cloud systems:
comparing the history information obtained from each of the plurality of cloud systems that has previously run the application to the application information;
matching the application to a first cloud system of the plurality of cloud systems based at least in part on the comparison, the matching comprising:
determining that a difference between a value of at least one parameter of the history information of the first cloud system and a value of at least one corresponding parameter of the application information is smaller than a difference between a value of the at least one parameter of the history information of at least one other cloud system and the value of the at least one corresponding parameter of the application information based at least in part on the comparison; and
assigning the application to the first cloud system based at least in part on the determination that the difference is smaller;
scheduling the application to run on the first cloud system based at least in part on the matching of the application to the first cloud system; and
based at least in part on a determination that the history information has not been obtained from at least one of the plurality of cloud systems, scheduling the application to run on a second cloud system of the plurality of cloud systems.

2. The method of claim 1, further comprising:
updating the history information based on running of the application on at least one of the plurality of cloud systems.

3. The method of claim 1, wherein the second cloud system is selected randomly from the at least one of the plurality of cloud systems.

4. The method of claim 1, further comprising:
determining, from the history information, a history duration for running the application; and
predicting, based at last in part on the history duration, a duration for the first cloud system to run the application.

5. The method of claim 1, wherein obtaining the application information comprises:
determining an identifier and a workload of the application.

6. The method of claim 1, wherein the history information comprises at least one of the following:
an identifier of a run application, an identifier of a cloud system that ran an application, a workload of an application, a running duration of an application, and whether an application needs to keep running until terminated by a user.

7. An electronic device, comprising:
at least one processor; and
at least one memory including computer program instructions, the at least one memory and the computer program instructions being configured to, together with the at least one processor, cause the electronic device to:

obtain application information of an application to be run by one of a plurality of cloud systems;

obtain history information corresponding to the application from each of the plurality of cloud systems that has previously run the application;

based at least in part on a determination that the history information has been obtained from each cloud system of the plurality of cloud systems:

compare the history information obtained from each of the plurality of cloud systems that has previously run the application to the application information;

match the application to a first cloud system of the plurality of cloud systems based at least in part on the comparison, the matching comprising:

determining that a difference between a value of at least one parameter of the history information of the first cloud system and a value of at least one corresponding parameter of the application information is smaller than a difference between a value of the at least one parameter of the history information of at least one other cloud system and the value of the at least one corresponding parameter of the application information based at least in part on the comparison; and assigning the application to the first cloud system based at least in part on the determination that the difference is smaller;

schedule the application to run on the first cloud system based at least in part on the matching of the application to the first cloud system; and based at least in part on a determination that the history information has not been obtained from at least one of the plurality of cloud systems, schedule the application to run on a second cloud system of the plurality of cloud systems.

8. The electronic device of claim 7, wherein the at least one memory and the computer program instructions are further configured to, together with the at least one processor, cause the electronic device to:

update the history information based on running of the application on at least one of the plurality of cloud systems.

9. The electronic device of claim 7, wherein the second cloud system is selected randomly from the at least one of the plurality of cloud systems.

10. The electronic device of claim 7, wherein the at least one memory and the computer program instructions are further configured to, together with the at least one processor, cause the electronic device to:

determine, from the history information, a history duration for running the application; and predict, based at last in part on the history duration, a duration for the first cloud system to run the application.

11. The electronic device of claim 7, wherein the at least one memory and the computer program instructions are further configured to, together with the at least one processor, cause the electronic device to:

determine an identifier and a workload of the application.

12. The electronic device of claim 7, wherein the history information comprises at least one of the following:

an identifier of a run application, an identifier of a cloud system that ran an application, a workload of an application, a running duration of an application, and whether an application needs to keep running until terminated by a user.

13. A computer program product comprising a non-transitory computer readable medium having stored therein machine executable instructions which, when executed by at least one processing device comprising at least one processor and memory, causes the at least one processing device to perform steps of a method comprising:

obtaining application information of an application to be run by one of a plurality of cloud systems;

obtaining history information corresponding to the application from each of the plurality of cloud systems that has previously run the application;

based at least in part on a determination that the history information has been obtained from each cloud system of the plurality of cloud systems:

comparing the history information obtained from each of the plurality of cloud systems that has previously run the application to the application information;

matching the application to a first cloud system of the plurality of cloud systems based at least in part on the comparison, the matching comprising:

determining that a difference between a value of at least one parameter of the history information of the first cloud system and a value of at least one corresponding parameter of the application information is smaller than a difference between a value of the at least one parameter of the history information of at least one other cloud system and the value of the at least one corresponding parameter of the application information based at least in part on the comparison; and assigning the application to the first cloud system based at least in part on the determination that the difference is smaller;

scheduling the application to run on the first cloud system based at least in part on the matching of the application to the first cloud system; and based at least in part on a determination that the history information has not been obtained from at least one of the plurality of cloud systems, scheduling the application to run on a second cloud system of the plurality of cloud systems.

14. The computer program product of claim 13, wherein the steps of the method further comprise:

updating the history information based on running of the application on at least one of the plurality of cloud systems.

15. The computer program product of claim 13, wherein the second cloud system is selected randomly from the at least one of the plurality of cloud systems.

16. The computer program product of claim 13, wherein the steps of the method further comprise:

determining, from the history information, a history duration for running the application; and predicting, based at last in part on the history duration, a duration for the first cloud system to run the application.

17. The computer program product of claim 13, wherein obtaining the application information comprises:

determining an identifier and a workload of the application.

* * * * *